US010175907B2

(12) United States Patent
Goto

(10) Patent No.: US 10,175,907 B2
(45) Date of Patent: Jan. 8, 2019

(54) STORAGE DEVICE, FILE WRITING METHOD, AND NON-TRANSITORY COMPUTER READABLE STORAGE MEDIUM

(71) Applicant: YAHOO JAPAN CORPORATION, Tokyo (JP)

(72) Inventor: Yasuharu Goto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 36 days.

(21) Appl. No.: 15/447,811

(22) Filed: Mar. 2, 2017

(65) Prior Publication Data

US 2017/0344305 A1  Nov. 30, 2017

(30) Foreign Application Priority Data

May 25, 2016 (JP) ................................ 2016-104303

(51) Int. Cl.
*G06F 12/00* (2006.01)
*G06F 3/06* (2006.01)
*G06F 17/30* (2006.01)

(52) U.S. Cl.
CPC .......... *G06F 3/0643* (2013.01); *G06F 3/0604* (2013.01); *G06F 3/067* (2013.01); *G06F 3/0611* (2013.01); *G06F 3/0653* (2013.01); *G06F 3/0689* (2013.01); *G06F 17/30* (2013.01)

(58) Field of Classification Search
None
See application file for complete search history.

(56) References Cited

U.S. PATENT DOCUMENTS

| 7,185,011 | B1* | 2/2007 | Dujari | ............... G06F 21/51 |
| 8,473,532 | B1* | 6/2013 | Ben | ............... G06F 17/30091 |
| | | | | 707/694 |
| 2005/0010610 | A1* | 1/2005 | Nishimura | ........ G06F 17/30067 |
| 2013/0173670 | A1* | 7/2013 | Li | ............... G06F 17/3007 |
| | | | | 707/803 |
| 2013/0290384 | A1* | 10/2013 | Anderson | ......... G06F 17/30091 |
| | | | | 707/822 |

(Continued)

FOREIGN PATENT DOCUMENTS

| JP | 2003-271617 A | 9/2003 |
| JP | 2004-139200 A | 5/2004 |
| JP | 2004-326162 A | 11/2004 |

(Continued)

OTHER PUBLICATIONS

Jun. 20, 2017 Office Action issued in Japanese Patent Application No. 2016-104303.

(Continued)

*Primary Examiner* — John A Lane
(74) *Attorney, Agent, or Firm* — Oliff PLC

(57) ABSTRACT

A storage device according to the present application includes a receiving unit and a control unit. The receiving unit receives a write request for writing a file with a specified directory name. The control unit writes the file in association with a directory of the specified directory name into a memory device, within a range up to an upper limit set for the number of files to be written in the memory device in association with each directory, in response to the write request received by the receiving unit.

10 Claims, 16 Drawing Sheets

(56) References Cited

U.S. PATENT DOCUMENTS

2017/0091206 A1* 3/2017 Wei .................... G06F 12/0833

FOREIGN PATENT DOCUMENTS

| JP | 2005-044345 A | | 2/2005 |
| JP | 2006-155457 A | | 6/2006 |
| JP | 2008-053971 A | | 3/2008 |
| JP | 2012-142020 A | | 7/2012 |
| JP | 2015036893 A | * | 2/2015 |
| JP | 2015-197810 A | | 11/2015 |

OTHER PUBLICATIONS

Apr. 11, 2017 Office Action issued in Japanese Patent Application No. 2016-104303.

* cited by examiner

310

| GROUP ID | HDD ID | DIRECTORY NAME | FILE NAME | LBA |
|---|---|---|---|---|
|  |  |  |  |  |
|  |  |  |  |  |

| LBA | PBA | DATA PRESENCE/ABSENCE |
|---|---|---|
|  |  |  |
|  |  |  |
| ⋮ | ⋮ | ⋮ |

| DIRECTORY NAME | NUMBER OF FILES | UPPER LIMIT VALUE |
|---|---|---|
|  |  |  |
|  |  |  |
| ⋮ | ⋮ | ⋮ |

STORAGE DEVICE, FILE WRITING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2016-104303 filed in Japan on May 25, 2016.

BACKGROUND OF THE INVENTION

1. Field of the Invention

The present invention relates to a storage device, a file writing method, and a non-transitory computer readable storage medium having stored therein a program.

2. Description of the Related Art

Technologies for distributing files to a plurality of file servers for file management have been known (refer to JP 2004-139200 A). According to some of this type of technologies, a plurality of directories are generated in advance in a file server, and a plurality of files are saved in association with respective directories.

If, however, the number of directories generated in a file server is small, the number of files saved in association with each directory will be enormous, which will result in an enormous amount of directory information indicating the relation between directories and files and gradually degrade file writing performance. In contrast, if the number of directories generated in a file server is large, files are distributed to a large number of directories, which may result in excessive distribution of file write positions.

SUMMARY OF THE INVENTION

It is an object of the present invention to at least partially solve the problems in the conventional technology.

A storage device according to the present application includes a receiving unit that receives a write request for writing a file with a specified directory name and a control unit that writes the file in association with a directory of the specified directory name into a memory device, within a range up to an upper limit set for the number of files to be written in the memory device in association with each directory, in response to the write request received by the receiving unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table illustrating an example of a logical-to-physical translation table 242A;

FIG. 7 is a table illustrating an example of a counter table 244A;

DETAILED DESCRIPTION OF THE PREFERRED EMBODIMENTS

Embodiments of a storage device, a file writing method, and a non-transitory computer readable storage medium having stored therein a program according to the present invention will now be described with reference to the drawings.

First Embodiment

Overall Configuration of Storage System 1

Figure 1:
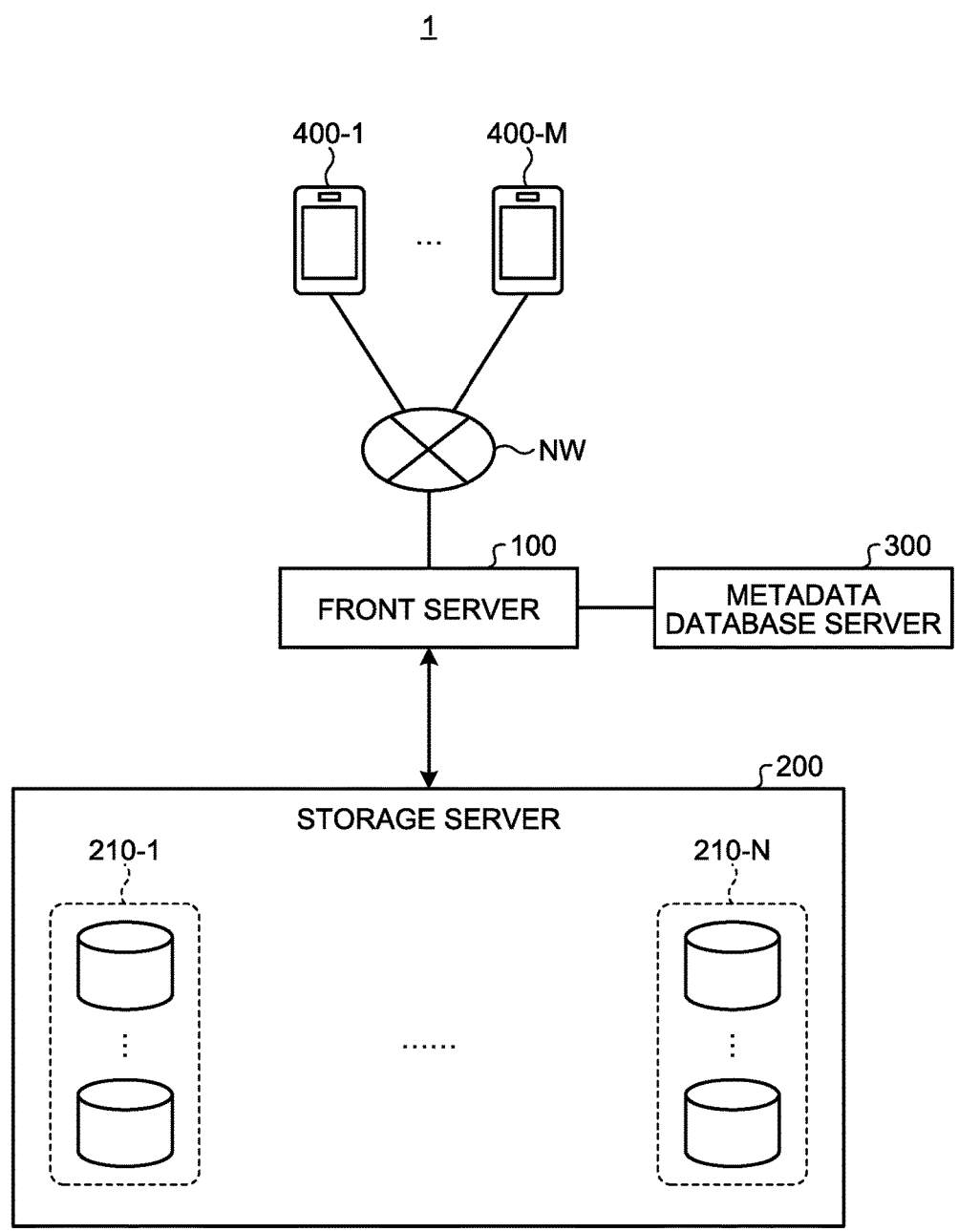
FIG. 1 is a diagram illustrating an example of a storage system 1 including a storage device according to a first embodiment.

FIG. 1 is a diagram illustrating an example of a storage system 1 according to a first embodiment. The storage system 1 provides a storage service of storing files in a storage server according to upload requests from a plurality of user terminals, and allowing user terminals to browse or download stored files according to browse requests or download requests from user terminals, for example.

The storage system 1 includes a front server 100, a storage server 200, a metadata database server 300, and user terminals 400-1, . . . 400-M (M is a natural number of 2 or larger), for example. In the storage system 1, a plurality of user terminals 400 and the front server 100 communicates information via a network NW. Examples of the network NW include a radio base station, a Wi-Fi access point, a communication line, a provider, and the Internet. In the description below, a user terminal will be referred to as a "user terminal 400" unless the user terminal is distinguished from other user terminals.

In addition, in the storage system 1, the front server 100 and the storage server 200, and the front server 100 and the metadata database server 300 are connected for communication via networks different from the network NW. Note that the front server 100, the storage server 200, and the metadata database server 300 illustrated in FIG. 1 may be implemented by a single server device or each may include a plurality of server devices.

Configuration of Front Server 100

Figure 2:
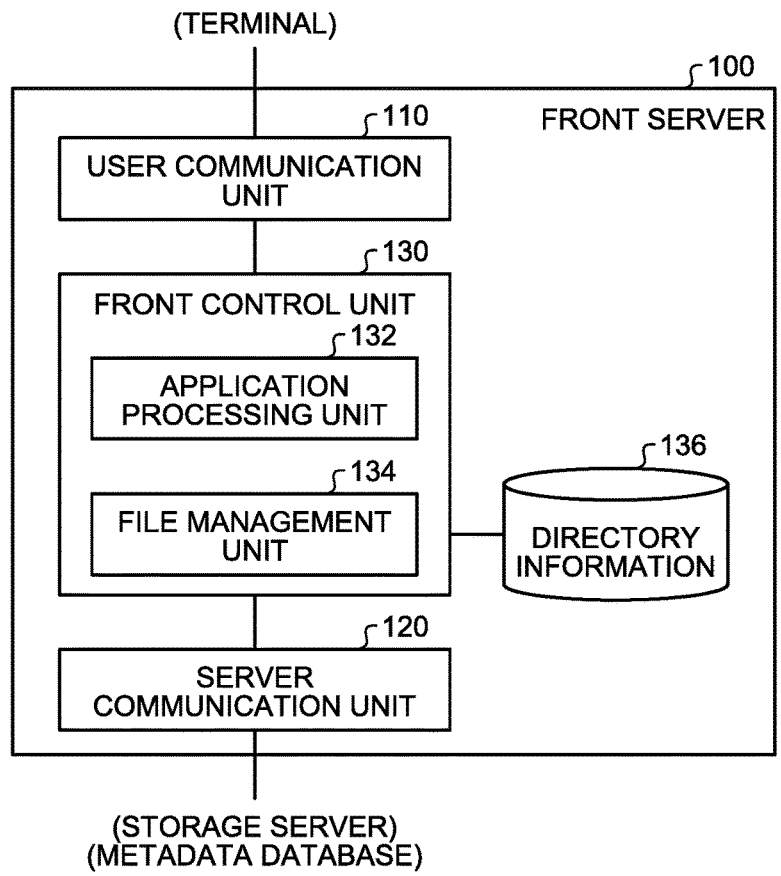
FIG. 2 is a diagram illustrating an example of a front server 100.

FIG. 2 is a diagram illustrating an example of the front server 100. The front server 100 includes a user communication unit 110, a server communication unit 120, and a front control unit 130, for example.

The user communication unit 110 and the server communication unit 120 include network interface cards (NICs), for example. The user communication unit 110 performs communication with a user terminal 400 used by a user via the network NW. The server communication unit 120 performs communication with the storage server 200 and the metadata database server 300 via other networks.

The front control unit 130 includes an application processing unit 132, and a file management unit 134. The application processing unit 132 is implemented by a processor such as a central processing unit (CPU) executing an application program stored in a program memory, for example. The file management unit 134 is implemented by a processor such as a CPU executing an operating system (OS) program stored in a program memory, for example. Some or all of functional units including the application processing unit 132 and the file management unit 134 may be implemented by hardware such as a large scale integration (LSI), an application specific integrated circuit (ASIC), or a field-programmable gate array (FPGA).

The application processing unit 132 uses the user communication unit 110 to receive a file upload request transmitted from a user terminal 400 (receiving unit). The file upload request is a request for writing a file with a specified directory. The application processing unit 132 transmits a write request in response to the file upload request to the storage server 200.

Figure 3:
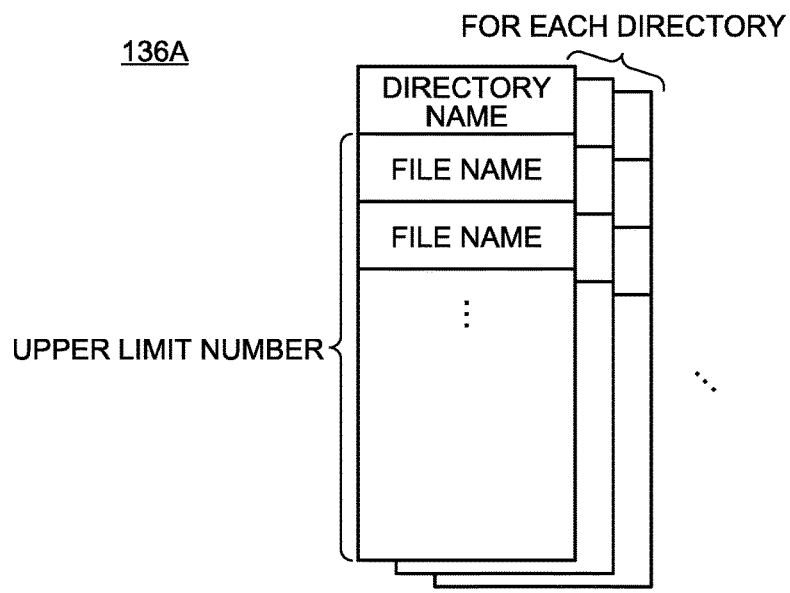
FIG. 3 is a diagram illustrating an example of directory information 136A.

The file management unit 134 writes directory information, relating to the file written in the storage server 200 in response to the upload request, into a cache memory 136. The directory information is management information for managing directories. FIG. 3 is a diagram illustrating an example of directory information 136A. The directory information associates each directory name with file names to be associated with the directory name within a predetermined upper limit number of file names, for example. The directory name is a directory name specified by the file upload request. The file names are file names of files to be written in response to the upload request. Note that the directory name may also be associated with other information such as time of addition or the like. In addition, a file name may be associated with an mode number, for identifying the file associated with the file name, by the file management unit 134; the association, however, is not limited thereto, and a file name may also be associated with other information such as upload time or the like.

Figures 4, 5:
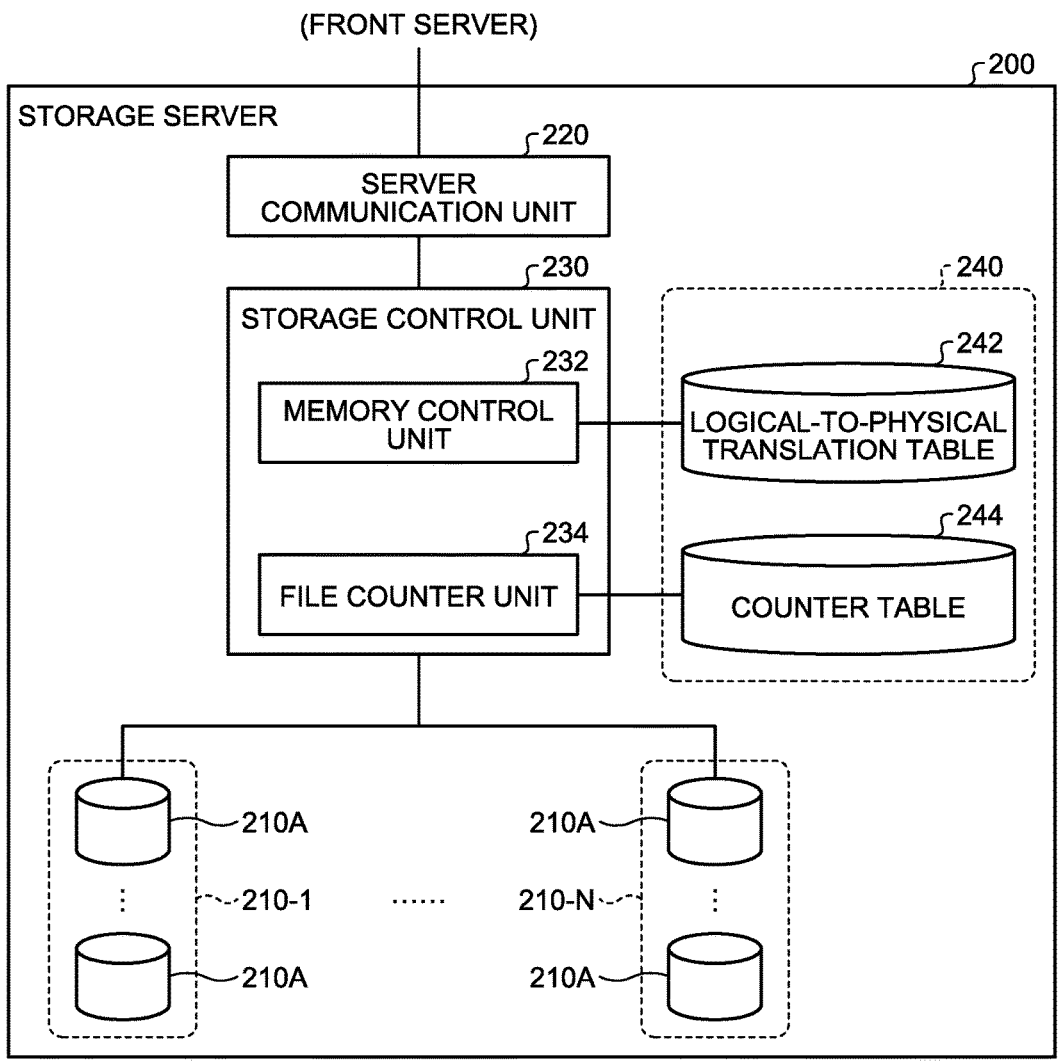
FIG. 4 is a table illustrating an example of metadata 310.
FIG. 5 is a diagram illustrating an example of a storage server 200.

When a file is written in the storage server 200, the file management unit 134 writes metadata into the metadata database server 300. FIG. 4 is a table illustrating an example of metadata 310. The metadata 310 includes a group ID, an HDD ID, a directory name, a file name, and a logical block address (LBA), for example. The group ID is identification information identifying one of groups into which the memory capacity of the whole file storage units 210 is divided by a predetermined memory capacity. Each group includes one or more hard disk devices 210A. Files are written into a group in parallel with the other groups. Note that examples of the "memory" include the cache memory 136 and the metadata database server 300. An external memory may be used instead of the cache memory 136.

Configuration of Metadata Database Server 300

The metadata database server 300 will be described prior to the storage server 200. The metadata database server 300 includes a communication unit and a memory device that stores the metadata 310, for example. When the metadata database server 300 has received the metadata 310 by using the communication unit, the metadata database server 300 writes the metadata 310 into a memory unit. The metadata database server 300 reads the metadata 310 according to a request from the front server 100, and transmits the read metadata 310 to the front server 100.

Configuration of Storage Server 200

FIG. 5 is a diagram illustrating an example of the storage server 200. The storage server 200 includes file storage units 210-1, . . . 210-N (N is a natural number of 2 or larger), a server communication unit 220, a storage control unit 230, and an information memory unit 240, for example. In the description below, a file storage unit will be referred to as a "file storage unit 210" unless the file storage unit is distinguished from other file storage units.

Each file storage unit 210 includes one or more hard disk devices 210A. A hard disk device 210A performs writing, reading and deletion of a file.

When a write command is supplied from the storage control unit 230, the file storage unit 210 writes a file contained in the write command into the hard disk device 210A. When a read command is supplied from the storage control unit 230, the file storage unit 210 reads a file specified by the read command from the hard disk device 210A, and outputs the read file to the storage control unit 230. When a delete command is supplied from the storage control unit 230, the file storage unit 210 deletes a file specified by the delete command from the hard disk device 210A.

The server communication unit 220 includes an NIC, for example. The server communication unit 220 performs communication with the storage server 200 via a network different from the network NW.

The storage control unit 230 includes a memory control unit 232 and a file counter unit 234, for example. The memory control unit 232 and the file counter unit 234 are implemented by a processor such as a CPU executing a server program stored in a program memory, for example. Some or all of functional units including the memory control unit 232 and the file counter unit 234 may be implemented by hardware such as an LSI, an ASIC, or a FPGA.

The information memory unit 240 includes a logical-to-physical translation table memory unit 242, and a file number memory unit 244, for example. The information memory unit 240 is implemented by a hard disc drive (HDD), flash memory, an electrically erasable programmable read only memory (EEPROM), a read only memory (ROM), a random access memory (RAM), or the like. The information memory unit 240 stores various programs such as server programs, various processing results, and the like.

The memory control unit 232 uses the server communication unit 220 to write a file into the hard disk device 210A in response to a write request received from the front server 100. When a write request is received, the memory control unit 232 writes a file in association with a directory specified by the write request into the hard disk device 210A. In this process, the memory control unit 232 refers to a logical-to-physical translation table 242A stored in the logical-to-physical translation table memory unit 242 to convert the LBA contained in the write request into a PBA, and writes the file into a position associated with the PBA obtained by the conversion. When performing writing of a file a plurality of times, the memory control unit 232 sets the LBAs of the files to consecutive numbers, and writes files with LBAs close to one another into close PBAs in the hard disk device 210A, for example. FIG. 6 is a table illustrating an example of the logical-to-physical translation table 242A. Data presence/absence in the logical-to-physical translation table memory unit 242 is a data presence/absence flag indicating whether or not data are written in a physical block identified by a PBA, for example.

The file counter unit 234 counts the number of files written in association with each directory. The file counter unit 234 stores the result of count into a counter table 244A. The counter table 244A is management information for managing the number of files written in association with a directory. FIG. 7 is a table illustrating an example of the counter table 244A. A directory name in the counter table 244A is associated with the number of files, which is a result of count, and an upper limit value, for example.

(Configuration of Hard Disk Device 210A)

Figure 8:
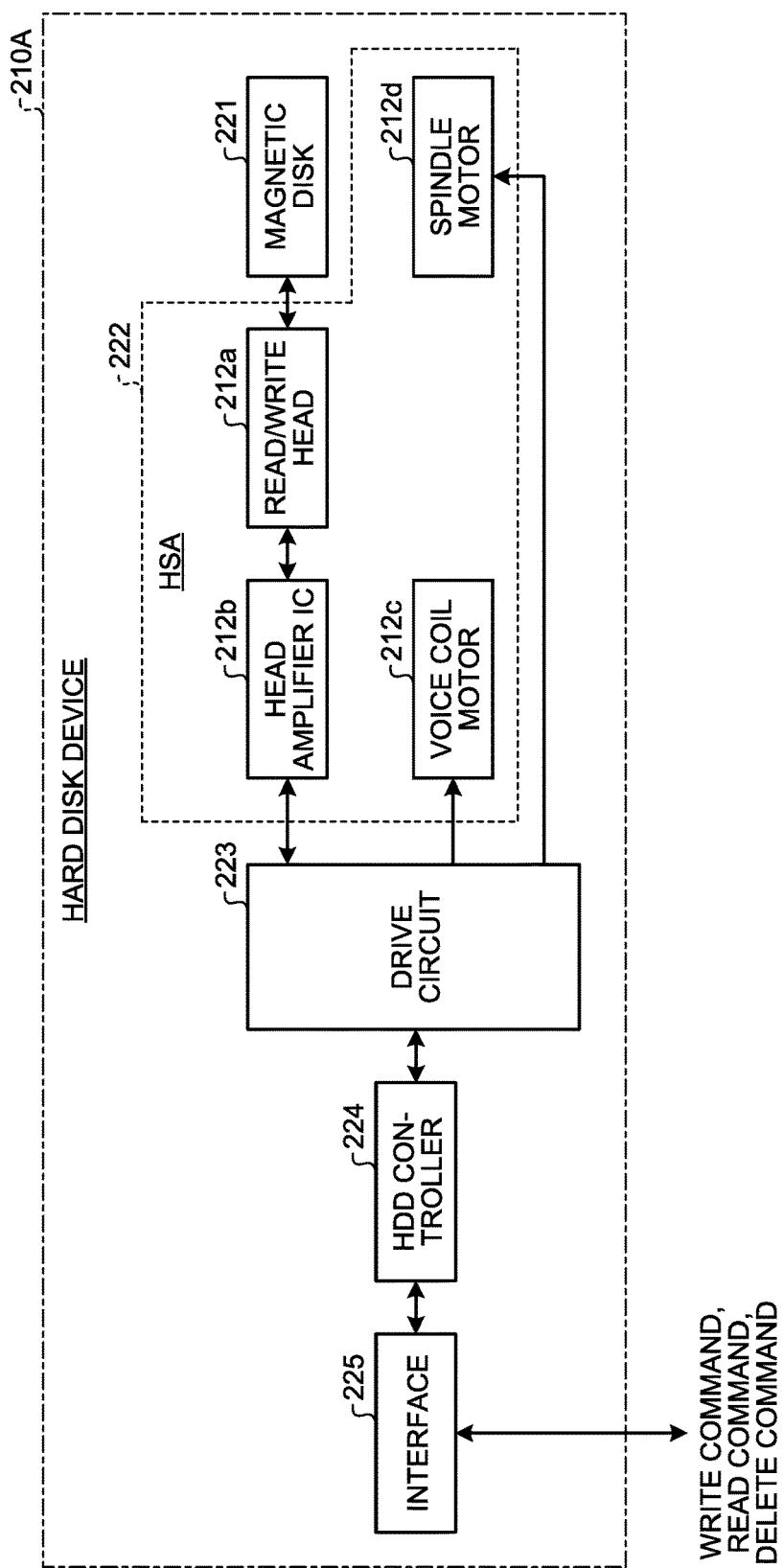
FIG. 8 is a diagram illustrating an example of a hard disk device 210A.

FIG. 8 is a diagram illustrating an example of the hard disk device 210A. The hard disk device 210A includes a magnetic disk 211, a head stack assembly (HSA) 212, a drive circuit 223, an HDD controller 224, and an interface 225, for example.

The magnetic disk 211 is a disk (platter) having a magnetic recording layers formed on front and back surfaces of the substrate of aluminum, glass, or the like. The magnetic disk 211 may be constituted by a single disk or may be constituted by a plurality of disks stacked in the disk thickness direction.

The head stack assembly 212 includes a read/write head 212a, a head amplifier IC 212b, a voice coil motor 212c, and a spindle motor 212d.

The read/write head 212a is mounted on a head arm, and is moved relatively to the magnetic disk 211 while seeking the magnetic disk 211 by drive force from the voice coil motor 212c. The read/write head 212a may be a thin film head with a magnetic core for both recording and reproduction, but is not limited thereto.

For writing a file, the read/write head 212a generates a magnetic field based on an electrical signal supplied by the head amplifier IC 212b to change the direction of magnetization of the magnetic recording layers of the magnetic disk 221. In this manner, the read/write head 212a write a file on the magnetic disk 221. The read/write head 212a generates an electrical signal according to the magnetization direction of a magnetic recording layer of the magnetic disk 211 while moving over the magnetic disk 211. The read/write head 212a supplies the generated electrical signal to the drive circuit 223 via the head amplifier IC 212b.

The head amplifier IC 212b amplifies the signal strength of the electrical signal supplied from the read/write head 212a. The head amplifier IC 212b also converts user data supplied from the drive circuit 223 into an electrical signal, and supplies the electrical signal to the read/write head 212a.

The voice coil motor 212c drives the head stack assembly 222 according to a drive current supplied from the drive circuit 223. In this manner, the voice coil motor 212c moves the read/write head 212a outward or inward along the radial direction (or along an oblique direction at an angle with respect to the radial direction) of the magnetic disk 211 to move the read/write head 212a from one track to another. The radial direction is a direction passing through the center of the magnetic disk. The spindle motor 212d rotates the magnetic disk 211 according to the drive current supplied from the drive circuit 223. The spindle motor 212d is a DC brushless motor, for example.

The drive circuit 223 sends and receives signal to/from the head amplifier IC, and drives the voice coil motor 212c and the spindle motor 212d. In this manner, the drive circuit 223 causes the read/write head 212a to seek a position associated with the PBA contained in a command, to write a file.

The HDD controller 224 uses the interface 225 to receive a read command, a write command, and a delete command transmitted from the front server 100. The HDD controller 224 writes information onto the magnetic disk 211 and reads information written on the magnetic disk 211 according to respective commands.

Overall Processing of Storage System 1

Figure 9:
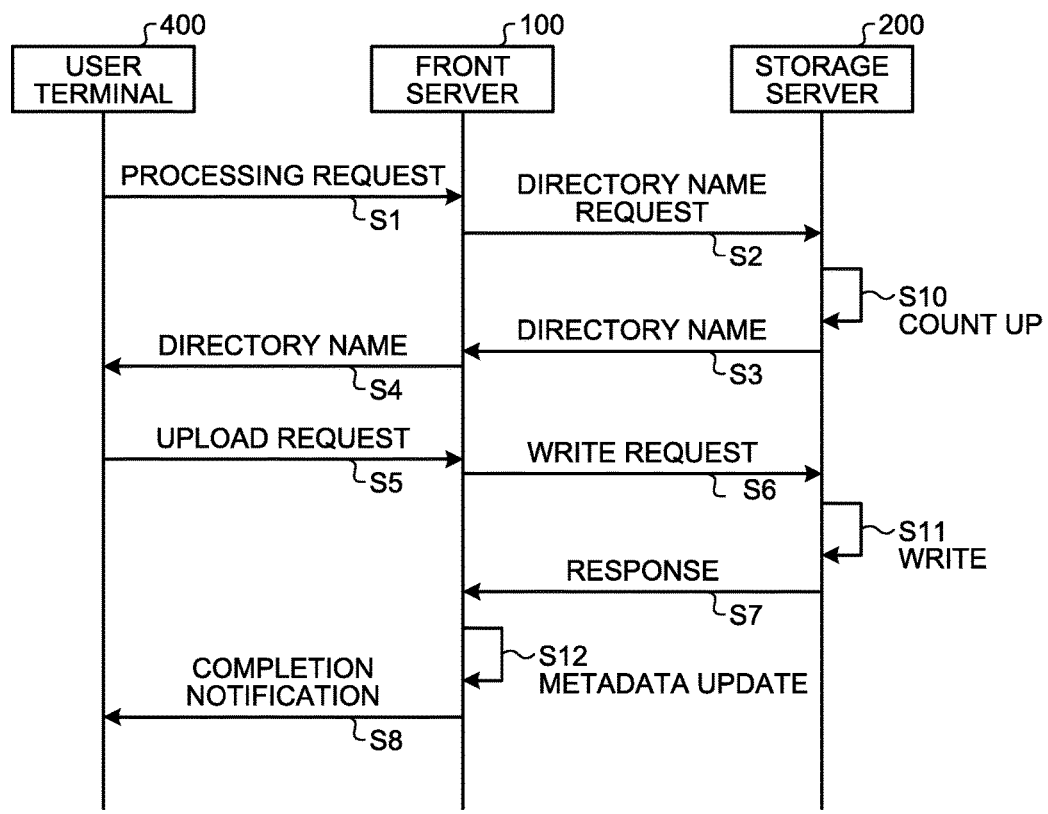
FIG. 9 is a chart illustrating an example of a process flow performed by a user terminal 400, the front server 100, and the storage server 200.

Hereinafter, a process of writing a file into the hard disk device 210A when the front server 100 has received a write request for writing a file with a specified directory name will be explained. FIG. 9 is a chart illustrating an example of a process flow performed by a user terminal 400, the front server 100, and the storage server 200.

For uploading a file, the user terminal 400 supplies an application program interface (API) call for an application program to upload a file according to operation of the user. In this manner, the application program of the user terminal 400 transmits a processing request S1 to call the application processing unit 132 to the front server 100. Note that the processing request S1 is information embedded in a hypertext transfer protocol (HTTP) request generated by a user agent (UA) such as an application or a browser in the user terminal 400.

Upon receiving the processing request S1, the front server 100 transmits a directory name request S2 requesting the directory name of the current directory to the storage server 200. Upon receiving the directory name request S2, the storage server 200 counts up the number of files associated with the current directory (step S10). The storage server 200 transmits the directory name S3 of the current directory to the front server 100. Upon receiving the directory name S3 of the current directory, the front server 100 transmits the directory name S3 as a directory name S4 of file writing destination to the user terminal 400.

The user terminal 400 transmits an HTTP request containing an upload request S5 specifying the directory name S4 to the front server 100. Upon receiving the upload request S5, the front server 100 transmits a write request S6 of the file with the specified directory name to the storage server 200.

Upon receiving the write request S6 transmitted from the front server 100, the storage server 200 writes the file in association with the directory having the directory name specified in the received write request S6 into the hard disk device 210A (step S11). Upon completion of writing the file, the storage server 200 transmits a response S7 to the front server 100.

Upon receiving the response S7, the front server 100 updates the metadata 310 relating to the file name of the file written in the hard disk device 210A (step S12). Subsequently, the front server 100 transmits a completion notification S8 reporting completion of file upload to the user terminal 400.

Operation of Front Server 100

Figure 10:
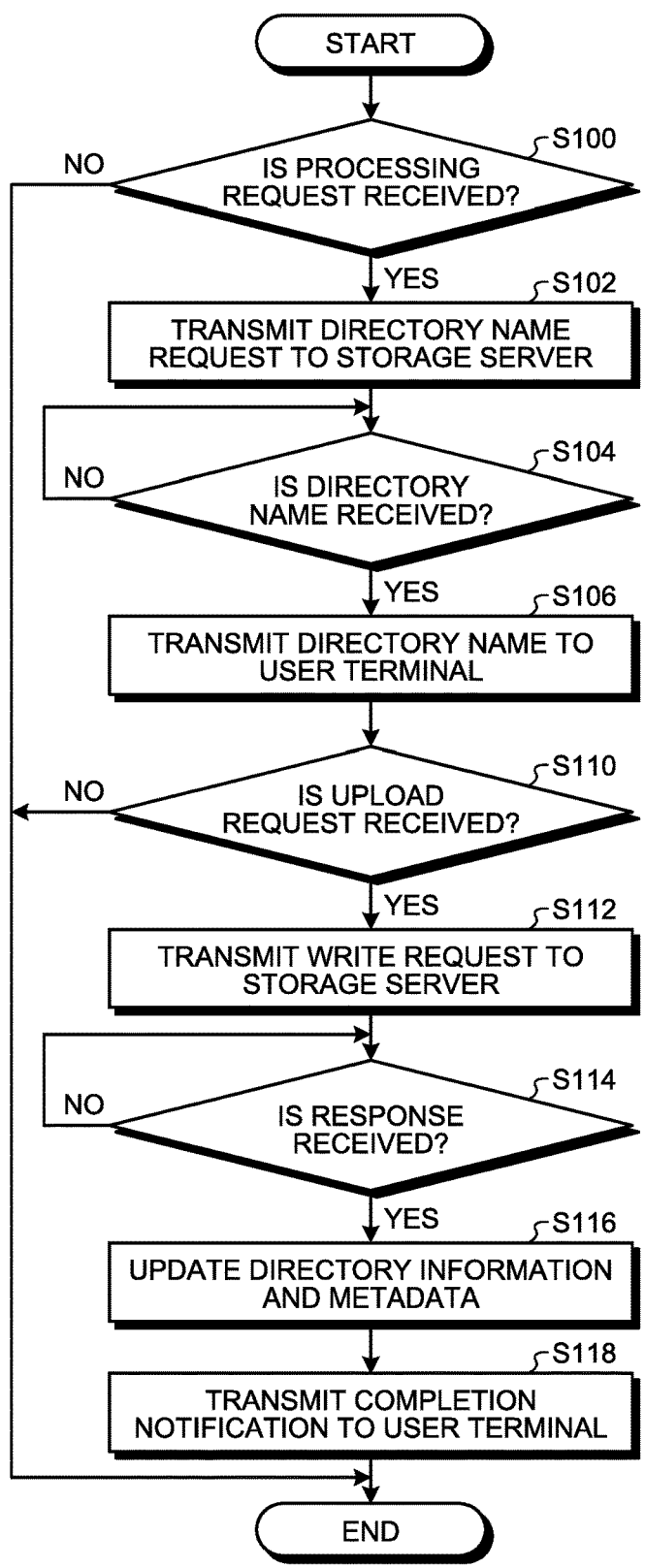
FIG. 10 is a flowchart illustrating an example of a process flow performed by the front server 100.

FIG. 10 is a flowchart illustrating an example of a process flow performed by the front server 100. The process illustrated in FIG. 10 is repeated at predetermined intervals by the application processing unit 132.

First, the application processing unit 132 determines whether or not a processing request S1 is received (step S100). When the processing request S1 is received, the application processing unit 132 transmits a directory name request S2 to the storage server 200 (step S102).

Subsequently, the application processing unit 132 determines whether or not a directory name S3 is received from the storage server 200 (step S104). When the directory name S3 is received, the application processing unit 132 transmits the directory name S4 to the user terminal 400 (step S106).

Subsequently, the application processing unit 132 determines whether or not an upload request S5 specifying the directory name S4 is received from the user terminal 400 (step S110). When the upload request S5 is received, the application processing unit 132 transmits a write request S6 containing the directory name S4 to the storage server 200 (step S112). In this process, the application processing unit 132 caches the file name of a file to be written in the directory information 136A.

Subsequently, the application processing unit 132 determines whether or not a response S7 is received from the storage server 200 (step S114). When the response S7 is received, the application processing unit 132 updates the directory information 136A and the metadata 310 (step S116). In this process, the application processing unit 132 adds the file name of the file written in the hard disk device 210A in association with the specified directory name to the directory information 136A. The application processing unit 132 also sends information such as the file name of the file written in the hard disk device 210A to the metadata database server 300. Subsequently, the application processing unit 132 transmits a completion notification S8 to the user terminal 400 (step S118).

When no processing request is received, or when no upload request is received, the front server 100 terminates the processing of this flowchart.

Note that the front server 100 may transmit the directory name S3 notified of by the storage server 200 to the user terminal 400, but the processing is not limited thereto, and the directory name S3 may be processed only in an API of the front server 100. When a directory name S3 is received from the storage server 200, the front server 100 stores the directory name S3 in a memory without transmitting the directory name S3 to the user terminal 400. When an upload request S5 is received from the user terminal 400, the front server 100 reads the stored directory name S3, and transmits the read directory name S3 and a write request S6 to the storage server 200. In this manner, the number of times of communication between the front server 100 and the user terminal 400 can be reduced.

Operation of Storage Server 200

Figure 11:
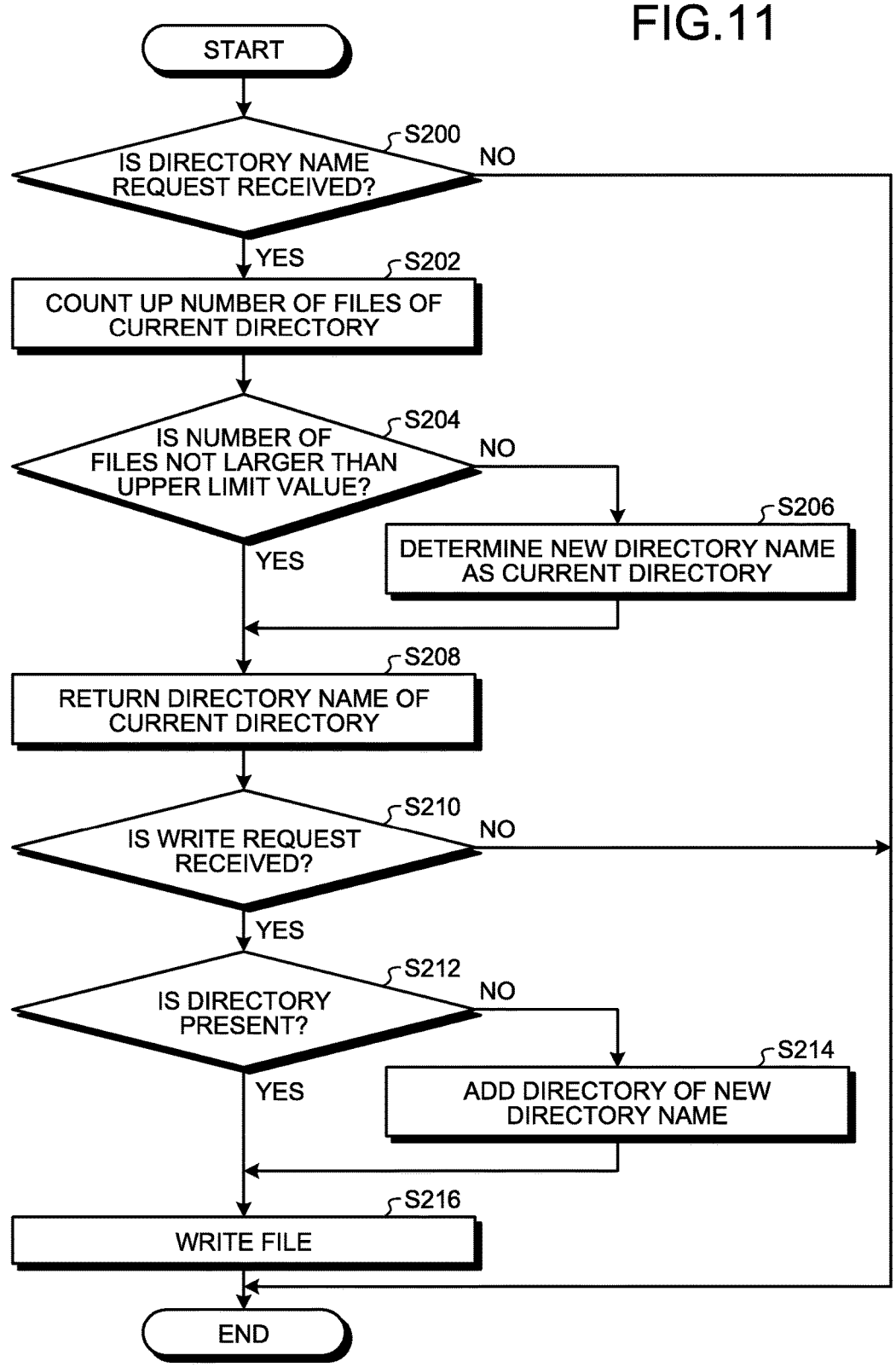
FIG. 11 is a flowchart illustrating an example of a flow of a first write process performed by the storage server 200.

FIG. 11 is a flowchart illustrating an example of a flow of a first write process performed by the storage server 200. The process illustrated in FIG. 11 is repeated at predetermined intervals by the storage control unit 230.

First, the memory control unit 232 determines whether or not a directory name request S2 is received (step S200). When a directory name request S2 is received, the file counter unit 234 counts up the number of files of the current directory (step S202).

Subsequently, the memory control unit 232 determines whether the number of files of the current directory, which is a result of the counting up by the file counter unit 234, is not larger than the upper limit value (step S204). When the number of files of the current directory is not larger than the upper limit value, the memory control unit 232 transmits the directory name of the current directory to the front server 100 (step S208). When the number of files has exceeded the upper limit value, the memory control unit 232 determines a new directory name as a directory name of the current directory (step S206). The memory control unit 232 returns the determined directory name of the new current directory to the front server 100 (step S208).

Subsequently, the memory control unit 232 determines whether or not a write request S6 is received from the front server 100 (step S210). When a write request S6 is received, the memory control unit 232 determines whether or not a directory of the specified directory name is present (step S212). When the directory of the specified directory name is present in the counter table 244A, the memory control unit 232 writes a file in association with this directory (step S216).

When the directory of the specified directory name is not present in the counter table 244A, the memory control unit 232 adds the directory of the new directory name by writing management information of the directory associated with the determined directory name of the current directory into the counter table 244A (step S214). The memory control unit 232 writes a file in association with the added directory (step S216).

When no directory name request is received, or when no write request is received, the storage server 200 terminates the processing of this flowchart.

Relation Between Directory and File in Write Process

Figures 12A, 12B:
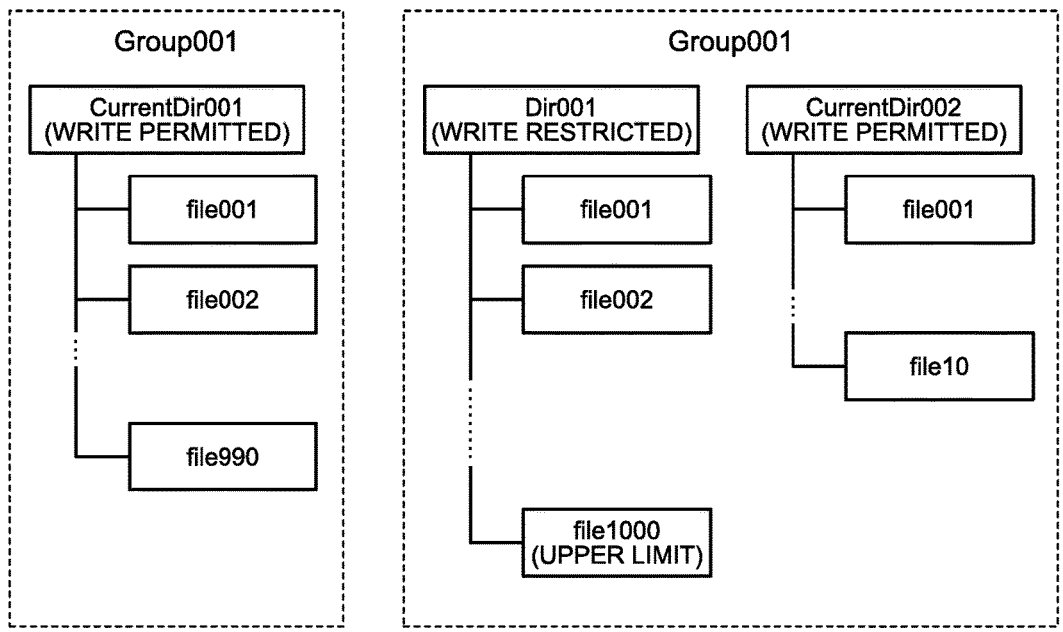
FIGS. 12A and 12B are diagrams illustrating relations between each directory and files.

Hereinafter, a process of writing a file in association with a directory in the above-described storage server 200 will be described. FIGS. 12A and 12B are diagrams illustrating relations between each directory and files.

In the description with reference to FIGS. 12A and 12B, the upper limit value that is the upper limit of the number of files is assumed to be "1000." As illustrated in FIG. 12A, assume that the memory control unit 232 adds information on a directory of a directory name "001" for a group ID "001" to the counter table 244A, and receives a write request of 990 files from the front server 100. In this case, the memory control unit 232 writes the 990 files consecutively in association with one current directory.

In a case where the memory control unit 232 is to write a 1001-st file after writing 1000 files in association with a directory of a directory name "001," the memory control unit 232 adds a new directory of a directory name "002." The memory control unit 232 writes the 1001-st file in association with the current directory that is the added new directory. Thus, when a new directory is added, the memory control unit 232 writes a file in association with the new directory instead of writing the file in association with the directory where the number of files has exceeded the upper limit value. Such operation can also be described as follows: counting the number of files written in association with each directory, and restricting writing of a file in association with the directory when the counted number of files has exceeded the upper limit value.

Relation Between a File Write Request and Transition in Write Process

Figure 13:
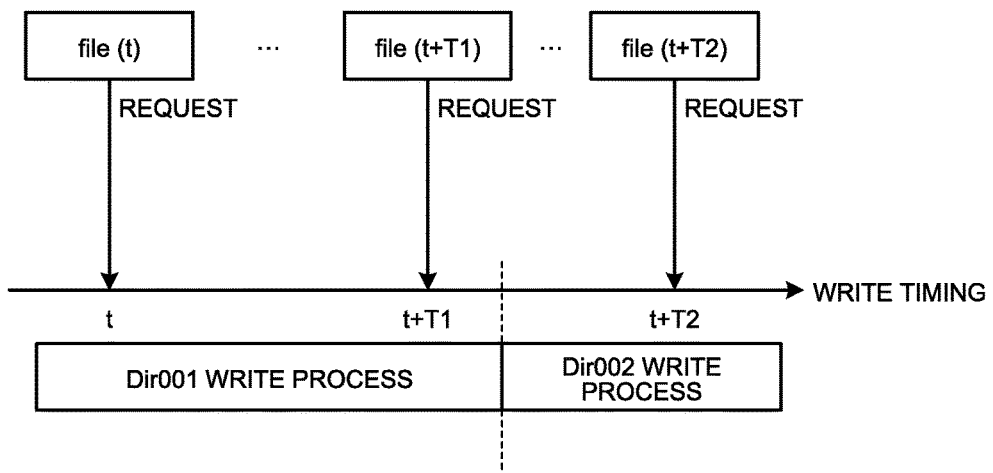
FIG. 13 is a diagram illustrating a relation between the time at which a write request is received and a write process for each directory.

FIG. 13 is a diagram illustrating a relation between the time at which a write request is received and a write process for each directory. In a case where the number of files written in association with a directory dir001 of a directory name "001" is not larger than the upper limit value, the memory control unit 232 performs a write process of a file in association with the directory dir001. The write process of a file in association with the directory dir001 is a process of writing a file in association with only the directory dir001 without writing the file in association with a directory other than the directory dir001. When a write request for a file (file(t)) is received at time t during a period when the memory control unit 232 performs a write process of a file in association with the directory dir001, the memory control unit 232 writes the file (file(t)) in association with the directory dir001. When a write request for a file (file(t+T1)) is received at time t+T1 during this period, the memory control unit 232 writes the file in association with the directory dir001.

If the number of files written in the directory dir001 has exceeded the upper limit value as a result of writing the file (file(t+T1)) in association with the directory dir001, the memory control unit 232 moves to a write process of a file in association with a directory dir002. The write process of a file in association with the directory dir002 is a process of writing a file in association with only the directory dir002 without writing the file in association with a directory other than the directory dir002. In this manner, when a write request for a file (file(t+T2)) is received at time t+T2 during a period when the memory control unit 232 performs a write process of a file in association with the directory dir002, the memory control unit writes the file in association with the directory dir002.

Figure 14:
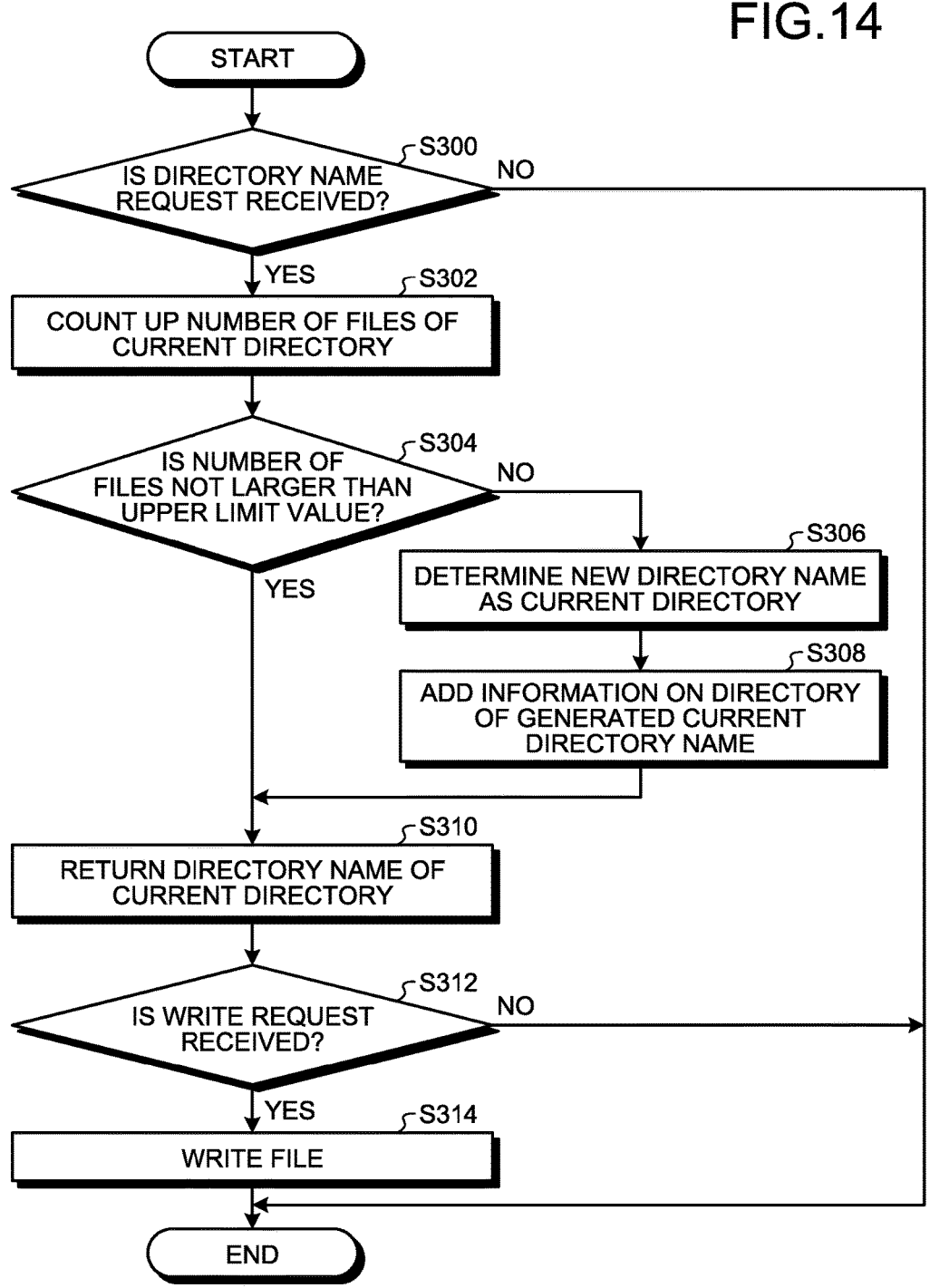
FIG. 14 is a flowchart illustrating an example of a flow of a second write process performed by the storage server 200.

The storage server 200 may perform the following process instead of the process illustrated in FIG. 11. FIG. 14 is a flowchart illustrating another example of a flow of a write process performed by the storage server 200. The write process illustrated in FIG. 14 is repeated at predetermined intervals by the storage control unit 230.

First, the memory control unit 232 determines whether or not a directory name request S2 is received (step S300). When a directory name request S2 is received, the file counter unit 234 counts up the number of files of the current directory (step S302).

Subsequently, the memory control unit 232 determines whether the number of files of the current directory, which is a result of the counting up by the file counter unit 234, is not larger than the upper limit value (step S304). When the number of files of the current directory is not larger than the upper limit value, the memory control unit 232 transmits the directory name of the current directory to the front server 100 (step S310).

When the number of files has exceeded the upper limit value, the memory control unit 232 determines a new directory name as a directory name of the current directory (step S306). Subsequently, the memory control unit 232 adds the directory by writing management information of the directory associated with the determined directory name of the current directory into the counter table 244A (step S308). Subsequently, the memory control unit 232 transmits the added directory name of the current directory to the front server 100 (step S310).

Subsequently, the memory control unit 232 determines whether or not a write request S6 is received from the front server 100 (step S312). When a write request S6 is received, the memory control unit 232 writes a file into the added directory (step S314).

When no directory name request is received, or when no write request is received, the storage server 200 terminates the processing of this flowchart. This is the description of a second write process.

The storage server 200 writes files into a hard disk device 210A within a range up to the upper limit set for the number of files to be written in association with each directory through the operation described above. Note that the front server 100 and the storage server 200 function as storage devices by performing the processes illustrated in FIG. 10, and FIG. 11 or FIG. 14.

Effects of First Embodiment

According to the storage system 1 of the first embodiment as described above, files are written in association with a specified directory name, within a range up to the upper limit set for the number of files to be written in association with each directory into a hard disk device 210A, in response to write requests received from the front server 100. This allows the number of files associated with a directory to be restricted. Thus, with the storage system 1, the directory information 136A is prevented from growing to a vast amount. As a result, with the storage system 1, the time taken to seek directory names is reduced, which shortens the time taken to write files.

Furthermore, with the storage system 1 of the first embodiment, since files are written consecutively into one directory until the number of files associated with the directory reaches the upper limit value, the files written consecutively are not distributed to multiple directories. Files written consecutively can also be referred to as files written substantially at the same time. Consequently, with the storage system 1, files written substantially at the same time can be located close to one another on the magnetic disk 221. As a result, with the storage system 1, the read time for reading multiple files written substantially at the same time is shortened.

Second Embodiment

A second embodiment will now be described. A storage server 200 of the second embodiment is different from the storage system 1 of the first embodiment in that a directory name is reported to a front server 100 through push notification when the number of files written with the directory name of the current directory has exceeded an upper limit value. This difference will be mainly described below.

Overall Processing in Second Embodiment

Figure 15:
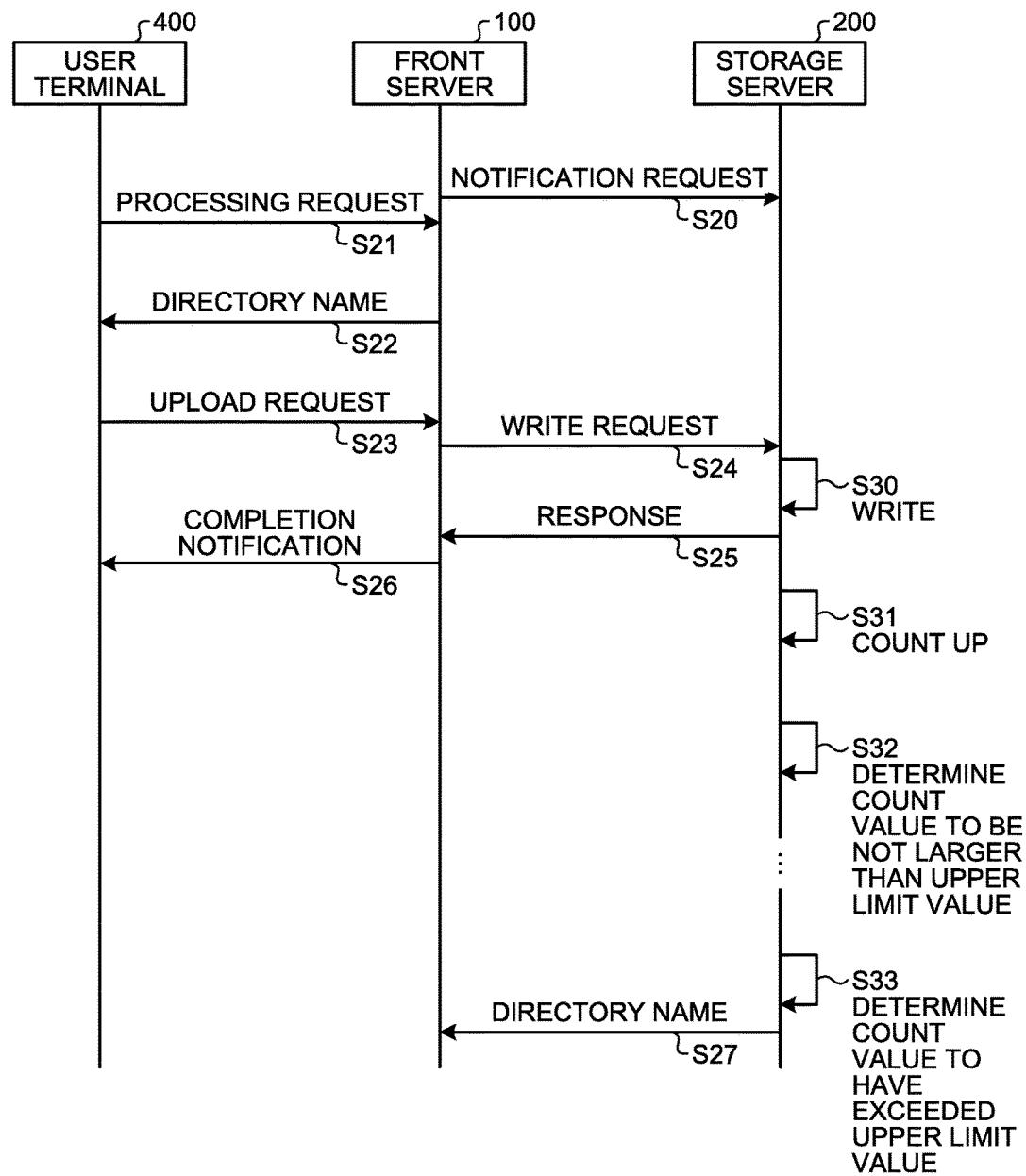
FIG. 15 is a chart illustrating an example of a process flow performed by a user terminal 400, a front server 100, and a storage server 200.

FIG. 15 is a chart illustrating an example of a process flow performed by a user terminal 400, the front server 100, and the storage server 200.

First, the front server 100 transmits a notification request S20 to the storage server 200. The notification request S20 is a message requesting to report a message notifying the front server 100 of the directory name of the current directory through push notification at a timing when the current directory is newly set in the storage server 200. The front server 100 transmits the notification request S20 to the storage server 200 at a timing when a launch of an application program is completed after the front server 100 is powered on or periodically during activation of the front server 100, for example. The notification request S20 is not limited to be reported through push notification at a timing when a directory is newly added, but may be at a timing when a new directory is added in a case where the new directory is added after determination of a new directory name as illustrated in FIG. 14.

Upon receiving a processing request S21, the front server 100 transmits a directory name S22 of the current directory, having already been received from the storage server 200 through push notification, to a user terminal 400. Upon receiving an upload request S23, the front server 100 transmits a write request S24 of a file with a specified directory name to the storage server 200.

Upon receiving the write request S24 transmitted from the front server 100, the storage server 200 writes the file in association with the directory name specified in the received write request S24 into a hard disk device 210A (step S30). Upon completion of writing the file, the storage server 200 transmits a response S25 to the front server 100. In this manner, the storage server 200 causes the front server 100 to transmit a completion notification S26 to the user terminal 400.

Subsequently, the storage server 200 counts up the number of files associated with the current directory (step S31). Each time the storage server 200 writes a file, the storage server 200 determines whether or not the number of files associated with the directory name of the current directory has exceeded the upper limit value. When the number of files associated with the directory name of the current directory is not larger than the upper limit value, the storage server 200 does not perform push notification (step S32). When the number of files associated with the directory name of the current directory has exceeded the upper limit value, the storage server 200 determines the directory name of a new current directory. The storage server 200 reports the determined directory name S27 of the new current directory to the front server 100 through push notification (step S33).

Note that the front server 100 may transmit a notification request to the storage server 200 when the front server 100 has received the directory name S27. In this manner, the front server 100 notifies the storage server 200 of the directory name of a directory added subsequently through push notification.

Note that the front server 100 may transmit the directory name S3 notified of by the storage server 200 to the user terminal 400, but the processing is not limited thereto, and the directory name S3 may be processed only in an API of the front server 100. When a directory name S3 is received from the storage server 200, the front server 100 stores the directory name S3 in a memory without transmitting the directory name S3 to the user terminal 400. When an upload request S5 is received from the user terminal 400, the front server 100 reads the stored directory name S3, and transmits the read directory name S3 and a write request S6 to the storage server 200. In this manner, the number of times of communication between the front server 100 and the user terminal 400 can be reduced.

Effects of Second Embodiment

With the storage system 1 of the second embodiment, the storage server 200 need not notify the front server 100 of the directory name each time the storage server 200 receives a processing request from the front server 100. Thus, with the storage system 1, the processing load on the storage server 200 is reduced. Furthermore, with the storage system 1, the number of times of communication between the front server 100 and the storage server 200 is reduced.

Third Embodiment

A third embodiment will now be described. A storage server 200 of the third embodiment is different from the first and second embodiments described above in that the upper limit value of the number of files of a directory that is a current directory is decreased when the time taken to write a file exceeds a predetermined time. This difference will be mainly described below.

Write Process in Storage Server 200

Figure 16:
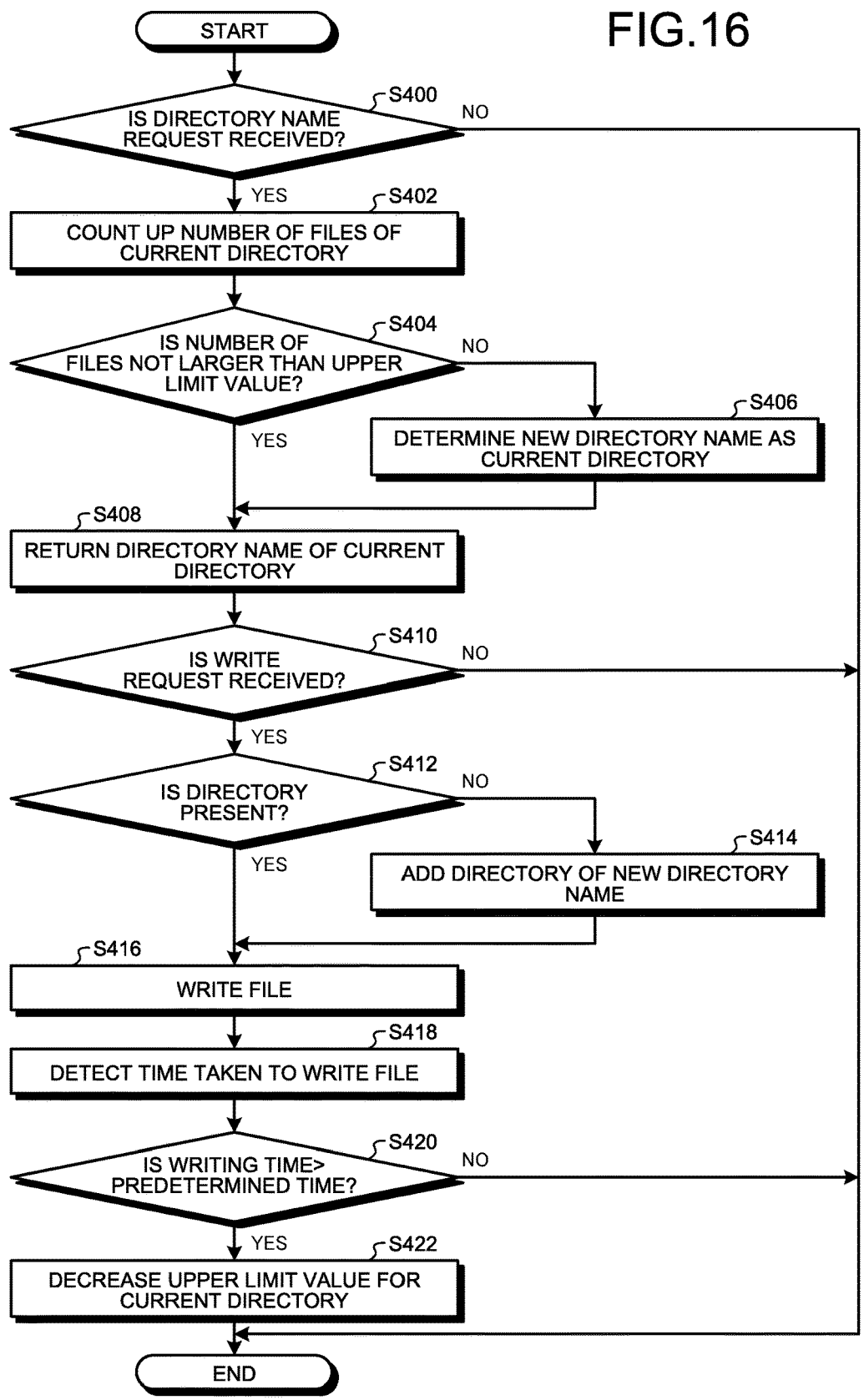
FIG. 16 is a flowchart illustrating an example of a flow of a third write process performed by the storage server 200.

FIG. 16 is a flowchart illustrating an example of a flow of a third write process performed by the storage server 200. The process illustrated in FIG. 16 is repeated at predetermined intervals by the storage control unit 230.

First, the memory control unit 232 determines whether or not a request is received (step S400). When a request is received, the file counter unit 234 counts up the number of files of the current directory (step S402).

Subsequently, the memory control unit 232 determines whether the number of files of the current directory, which is a result of the counting up, is not larger than the upper limit value (step S404). When the number of files of the current directory is not larger than the upper limit value, the memory control unit 232 transmits the directory name of the current directory to the front server 100 (step S408). When the number of files of the current directory has exceeded the upper limit value, the memory control unit 232 determines a new directory name as a directory name of the current directory (step S406). The memory control unit 232 returns the set directory name of the new current directory to the front server 100 (step S408).

Subsequently, the memory control unit 232 determines whether or not a write request is received from the front server 100 (step S410). When a write request is received, the memory control unit 232 determines whether or not a directory for which a specified directory name is set is present (step S412). When the directory for which the specified directory name is set is present, the memory control unit 232 writes a file in this directory (step S416). When the directory for which the specified directory name is set is not present, the memory control unit 232 adds the directory by writing management information of the directory associated with the determined directory name of the current directory into the counter table 244A (step S414).

Subsequently, the memory control unit 232 writes a file in association with the added directory (step S416). Subsequently, the memory control unit 232 detects time taken to write a file (step S418). The memory control unit 232 detects the time taken to write a file by measuring a period from the time when a write command is output to a hard disk device 210A until the time when a response of completion of writing is input from the hard disk device 210A, for example.

The memory control unit 232 determines whether or not the detected writing time exceeds a predetermined time (step S420). When the detected writing time exceeds the predetermined time, the memory control unit 232 decreases the upper limit value for the directory that is the current directory (step S422).

When no directory name request is received, when no write request is received, or when the writing time does not exceed the predetermined time, the storage server 200 terminates the processing of this flowchart.

While the storage system 1 is configured such that the storage server 200 changes the upper limit value of the number of files when the time taken to write a file exceeds a predetermined time, the storage system 1 is not limited thereto. The front server 100 may notify the storage server 200 when time taken from the time when a write request is transmitted to the storage server 200 until the time when a response is received from the storage server 200 exceeds a predetermined time. Upon receiving the notification from the front server 100, the storage server 200 restricts writing of a file in association of the current directory. The storage server 200 then determines a directory name of a new current directory, and notifies the front server 100 of the directory name of the new current directory.

Furthermore, while the storage system 1 decreases the upper limit value associated with a directory when the time taken to write a file exceeds a predetermined time, the storage system 1 is not limited thereto. The storage system 1 may increase the upper limit value associated with a directory when the time taken to write a file is shorter than a predetermined time.

Effects of Third Embodiment

With the storage system 1 of the third embodiment, since the upper limit value associated with a directory of the current directory when the time taken to write a file exceeds a predetermined time, the number of files written in association with the current directory can be reduced. Thus, with the storage system 1, the time taken to write a file is prevented from becoming longer.

Example 1

Figure 17:
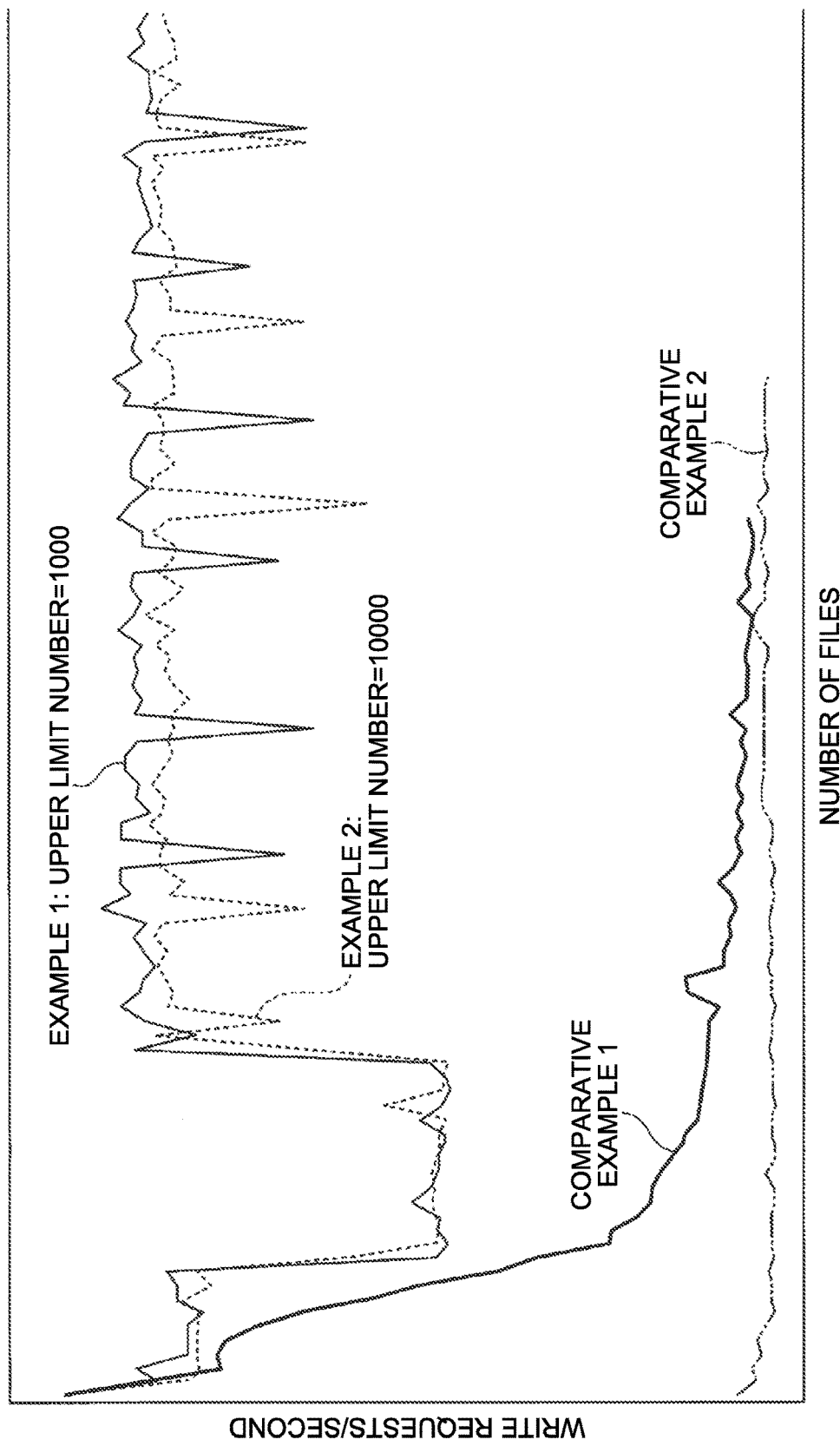
FIG. 17 is a graph illustrating the relation between the number of files written in association with a current directory and the number of write requests being processed per second.

Hereinafter, Example 1 of the storage system 1 described above will be described. FIG. 17 is a graph illustrating the relation between the number of files written in association with the current directory and the number of write requests being processed per second. In FIG. 17, Example 1 shows a change in the number of processed write requests when the upper limit value of the number of files to be associated with each directory is set to "1000" in the embodiments described above. Example 2 shows a change in the number of processed write requests when the upper limit value of the number of files to be associated with each directory is set to "10000" in the embodiments described above. Comparative example 1 shows a change in the number of processed write requests when files are written in association with one current directory. Comparative example 2 shows a change in the number of processed write requests when a fixed number of directories are set and the same number of sub-directories are set at a lower level than the directories.

It is shown that, in Examples 1 and 2, the number of processed requests does not decrease greatly even when the number of files to be associated with each directory is increased. In contrast, it is shown that, in Comparative example 1, the number of processed requests decreases sharply when the number of files exceeds a certain number. It is also shown that, in Comparative example 2, the number of processed requests is smaller than the numbers of processed requests in Examples 1 and 2 even after the number of files exceeds a certain number.

Example 2

Figure 18:
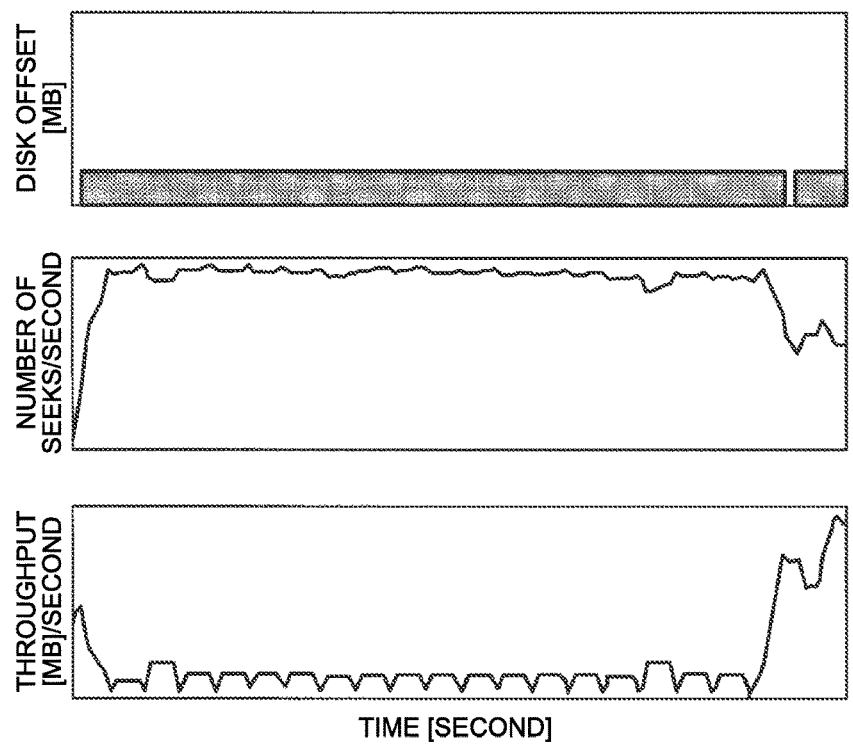
FIG. 18 illustrates graphs showing disk offset, the number of seeks, and throughput in Comparative example 1.
Figure 19:
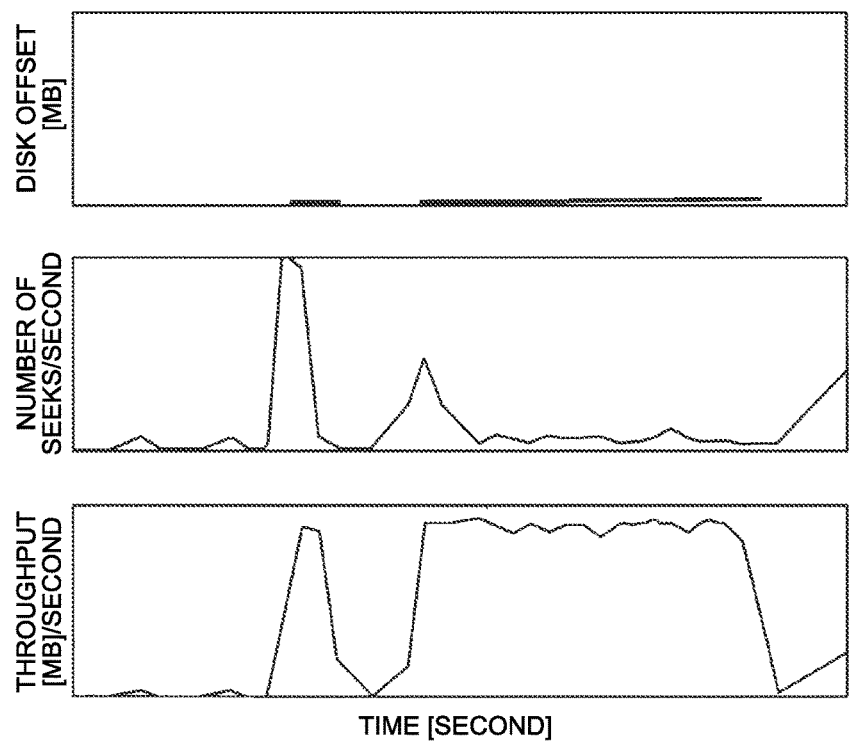
FIG. 19 illustrates graphs showing disk offset, the number of seeks, and throughput in Example.

Hereinafter, Example 2 of the storage system 1 described above will be described. FIG. 18 illustrates graphs showing disk offset, the number of seeks, and throughput in Comparative example 1. FIG. 19 illustrates graphs showing disk offset, the number of seeks, and throughput in Example. The characteristics in FIGS. 18 and 19 are obtained through detection of signals at an interface 255 (block I/O layer) in the storage server 200 using blktrace.

With reference to FIG. 18 and FIG. 19, it is shown that the disk offset and the number of seeks in Example are lower than the disk offset and the number of seeks in the Comparative example. It is also shown that the throughput in the example is higher than the throughput in the comparative example.

Example 3

Figure 20:
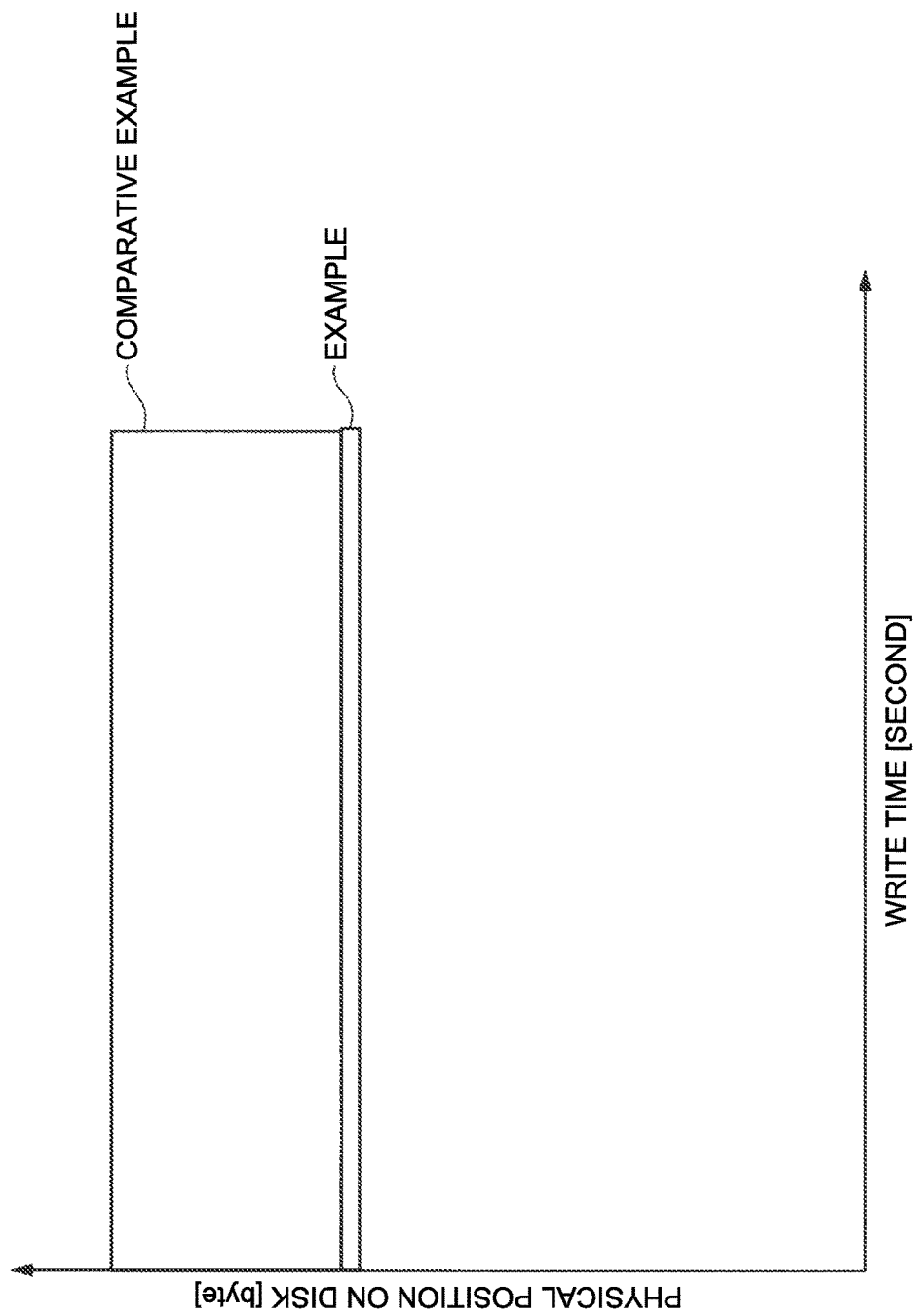
FIG. 20 is a graph illustrating a temporal change in physical positions of files written on a magnetic disk 221.

Hereinafter, Example 3 of the storage system 1 described above will be described. FIG. 20 is a graph illustrating a temporal change in physical positions of files written on the magnetic disk 221. With reference to FIG. 20, it is shown that files are written in a smaller area in Example than in the Comparative example.

Hardware Configuration

Figure 21:
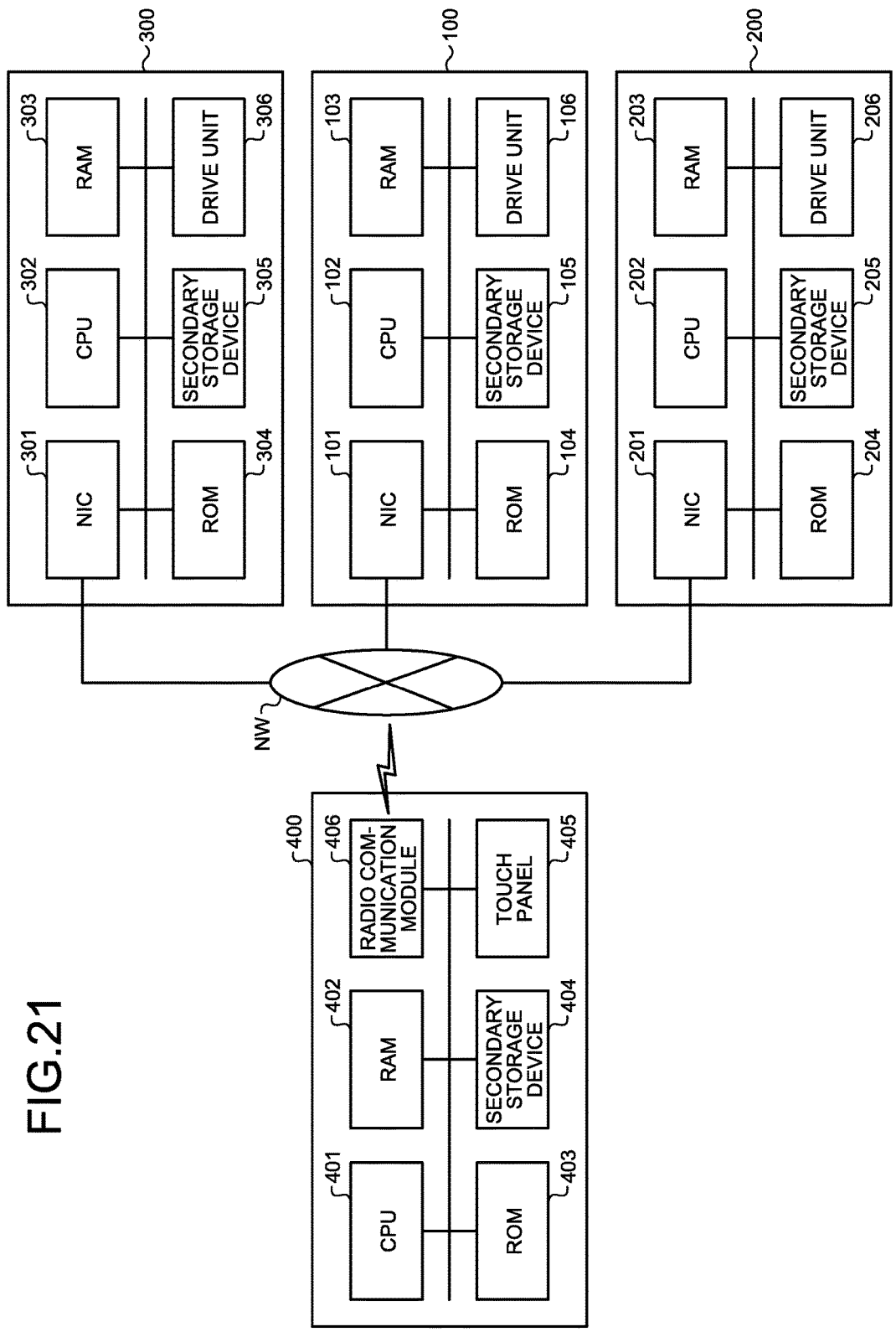
FIG. 21 is a diagram illustrating an example of hardware configurations of a user terminal 400, a front server 100, a storage server 200, and a metadata database server 300.

FIG. 21 is a diagram illustrating an example of a hardware configuration of the user terminal 400, the front server 100, the storage server 200, and the metadata database server 300. FIG. 21 illustrates an example in which the user terminal 400 is a portable phone such as a smart phone. The user terminal 400 has a configuration in which a CPU 401, a RAM 402, a ROM 403, a secondary memory device 404 such as flash memory, a touch panel 405, and a radio communication module 406 are connected with one another via an internal bus or dedicated communication lines, for example. A navigation application is downloaded via the network NW, and stored in the secondary memory device 404.

The front server 100 has a configuration in which an NIC 101, a CPU 102, a RAM 103, a ROM 104, a secondary memory device 105 such as flash memory or an HDD, and a drive unit 106 are connected with one another via an internal bus or dedicated communication lines, for example. A portable storage medium such as an optical disk is mounted on the drive unit 106. Programs stored in the secondary memory device 105 or the portable storage medium mounted on the drive unit 106 are expanded in the RAM 103 by a DMA controller (not illustrated) or the like and executed by the CPU 102, to implement the functional units of the respective servers.

The storage server 200 has a configuration in which an NIC 201, a CPU 202, a RAM 203, a ROM 204, a secondary memory device 205 such as flash memory or an HDD, and a drive unit 206 are connected with one another via an internal bus or dedicated communication lines, for example. A portable storage medium such as an optical disk is mounted on the drive unit 206. Programs stored in the secondary memory device 205 or the portable storage medium mounted on the drive unit 206 are expanded in the RAM 203 by a DMA controller (not illustrated) or the like and executed by the CPU 202, to implement the functional units of the respective servers.

The metadata database server 300 has a configuration in which an NIC 301, a CPU 302, a RAM 303, a ROM 304, a secondary memory device 305 such as flash memory or an HDD, and a drive unit 306 are connected with one another via an internal bus or dedicated communication lines, for example. A portable storage medium such as an optical disk is mounted on the drive unit 306. Programs stored in the secondary memory device 305 or the portable storage medium mounted on the drive unit 306 are expanded in the RAM 303 by a DMA controller (not illustrated) or the like and executed by the CPU 302, to implement the functional units of the respective servers.

According to an embodiment of the present invention, file processing performance is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus comprising:
a memory; and
a processor operatively coupled to the memory, the processor being programmed to:
receive a write request for writing a file with a specified directory name;
in response to the received write request, determine whether the received write request exceeds an upper limit set for the number of files to be written in the memory in association with a directory;
if the received write request does not exceed the upper limit, write the file in association with the directory of the specified directory name into the memory; and
if the received write request exceeds the upper limit, determine a new directory name and transmit the determined new directory name to an external server or terminal by push notification such that the external server or terminal is contacted by the storage apparatus regarding a write operation of the write request only when the received write request exceeds the upper limit.

2. The storage apparatus according to claim 1, wherein the processor restricts writing of files in association with the directory of the directory name when the counted number of files has exceeded the upper limit.

3. The storage apparatus according to claim 1, wherein when a write request for writing a file specifying the new directory name is received, the processor writes management information of a directory associated with the new directory name in a memory, and writes the file in association with the directory of the new directory name into the memory.

4. The storage apparatus according to claim 3, wherein when the processor has determined the new directory name, the processor writes a file in association with the directory of the new directory name into the memory without writing the file in association with a directory where the number of files exceeded the upper limit.

5. The storage apparatus according to claim 1, wherein when the processor has determined the new directory name, the processor writes management information of a directory associated with the determined new directory name into the memory.

6. The storage apparatus according to claim 1, wherein the processor changes the upper limit set for the number of files to be written in association with the directory on a basis of time taken to write the file in the memory.

7. The storage apparatus according to claim 1, wherein the processor is further programmed to: includes:
request a directory name of a current directory with which a file to be written on a basis of a new write request can be associated to a notification unit, when a request from a terminal device is received by the processor.

8. The storage apparatus according to claim 1, wherein the processor is further programmed to:
report a directory name of a current directory resulting from a change when the current directory with which a file to be written on a basis of a new write request can be associated has changed.

9. A file writing method for a storage apparatus, the file writing method comprising:
receiving, by a processor, a write request for writing a file with a specified directory name;
determining, by the processor, whether the received write request exceeds an upper limit set for the number of files to be written in the memory in association with a directory in response to the received write request;
if the received write request does not exceed the upper limit, writing, by the processor, the file in association with the directory of the specified directory name into the memory; and
if the received write request exceeds the upper limit, determining, by the processor, a new directory name and transmitting the determined new directory name to an external server or terminal by push notification such that the external server or terminal is contacted by the storage apparatus regarding a write operation of the write request only when the received write request exceeds the upper limit.

10. A non-transitory computer readable storage medium having stored therein a program causing a computer having a processor and memory to execute steps comprising:
receiving, by the processor, a write request for writing a file with a specified directory name; and
determining, by the processor, whether the received write request exceeds an upper limit set for the number of files to be written in the memory in association with a directory in response to the received write request;
if the received write request does not exceed the upper limit, writing, by the processor, the file in association with the directory of the specified directory name into the memory; and
if the received write request exceeds the upper limit, determining, by the processor, a new directory name and transmitting the determined new directory name to an external server or terminal by push notification such that the external server or terminal is contacted by the computer regarding a write operation of the write request only when the received write request exceeds the upper limit.

* * * * *